United States Patent [19]

Würmb et al.

[11] 3,936,413

[45] Feb. 3, 1976

[54] GLASS REINFORCED THERMOPLASTIC MOLDING MATERIAL CONTAINING ZINC SULFIDE PIGMENT

[75] Inventors: Rolf Würmb, Heidelberg; Raymond Denni, Ludwigshafen; Hans-Georg Dorst, Altrip; Rudolf Ilgemann, Hohensachsen, all of Germany

[73] Assignee: Badische Anilin- & Soda-Fabrik Aktiengesellschaft, Ludwigshafen (Rhine), Germany

[22] Filed: May 31, 1973

[21] Appl. No.: 365,735

[30] Foreign Application Priority Data

June 2, 1972  Germany............................ 2226932

[52] U.S. Cl............................ 260/40 R; 260/37 N
[51] Int. Cl.²....................... C08K 5/37; C08K 7/14
[58] Field of Search............ 260/40 R, 41 AG, 37 N; 106/293

[56] References Cited
UNITED STATES PATENTS

| | | | |
|---|---|---|---|
| 2,372,664 | 4/1942 | Duane | 260/37 N |
| 2,877,501 | 3/1959 | Brodt | 260/37 N |
| 3,164,563 | 1/1965 | Maxwell et al. | 260/37 N |
| 3,290,165 | 12/1966 | Iannicelli | 260/37 N |
| 3,462,389 | 8/1969 | Schulde et al. | 260/41 R |
| 3,833,534 | 9/1974 | Tierney et al. | 260/37 N |

FOREIGN PATENTS OR APPLICATIONS 1,010,043  11/1965  United Kingdom............... 260/40 R Primary Examiner—M. J. Welsh
Assistant Examiner—S. M. Person
Attorney, Agent, or Firm—Johnston, Keil, Thompson & Shurtleff

[57] ABSTRACT

Glass reinforced thermoplastic molding material pigmented with inorganic pigments and characterized by improved mechanical properties. Molding material according to the invention contains a pigment having a Mohs hardness of less than 5.

1 Claim, No Drawings

GLASS REINFORCED THERMOPLASTIC MOLDING MATERIAL CONTAINING ZINC SULFIDE PIGMENT

The invention relates to pigmented thermoplastic molding material reinforced with glass fibers which has improved mechanical properties.

Thermoplastics reinforced with glass fibers have certain advantages over thermoplastics which have not been reinforced which make them of great importance among plastics materials, particularly for injection molding. They have better mechanical properties and particularly better tensile and heat distortion strengths and a higher modulus of elasticity.

For a long time it has been known that glass reinforced thermoplastics which have been pigmented with inorganic pigments, as for example titanium dioxide, have much inferior mechanical properties to comparable materials without pigment. The effect of reinforcement resulting from the glass fibers is partly counteracted in this way. Impact strength which is usually low in the case of glass reinforced thermoplastics is further impaired.

Inorganic pigments generally have considerable advantages over organic dyes and pigments. They have high thermal stability and withstand the temperatures required for extrusion or injection molding of glass reinforced thermoplastics which are far above the temperatures required for processing nonreinforced materials, particularly when the content of glass fibers is high. For example anthraquinone dyes decompose when incorporated into polyamides. Moreover it is only the inorganic white pigments which have the high refractive index which ensures good scattering of light and a high brightening power. It is for this reason that most recipes prefer titanium dioxide as a white pigment.

It is an object of the present invention to provide glass reinforced thermoplastic molding materials pigmented with an inorganic pigment which are devoid of the abovementioned disadvantages and which therefore are distinguished by good tinctorial characteristics and good mechanical properties such as tensile strength and impact strength.

We have found that surprisingly this object may be achieved with a molding material reinforced with glass fibers and pigmented with an inorganic pigment which in accordance with the invention contains an inorganic pigment having a Mohs hardness of less than 5 and preferably less than 4.

This molding materials has considerably better tensile strength and impact strength than for example glass reinforced thermoplastic molding material pigmented with titanium dioxide.

Colored metal salts and minerals and white metal salts and minerals which have an adequately high refractive index to the plastics are included among inorganic pigments for the purposes of the present invention. An example of a particularly suitable white pigment is zinc sulfide of the sphalerite or wurtzite structure. Good coloring properties and hiding power are achieved with finely divided pigments. Pigments with a sieve residue (test sieve cloth 0.04 according to DIN No. 4188) of less than 0.01% according to DIN No. 55,580 are preferred. The pigments may also have undergone a surface treatment which improves for example the dispersibility in the plastics.

All plastics capable of being processed under the action of heat, as for example polyamides, polyesters (particularly those of terephthalic acid), styrene polymers (including those which have had impact strength modification), polyoxymethylenes, polyolefins, polyvinyl chloride and the like, and their copolymers and mixtures of polymers are included among thermoplastics for the purposes of the invention. In addition to the glass fibers used as reinforcement material they may contain other fillers as for example glass spheres, mineral fillers such as chalk, mica, talc and the like and if desired processing aids, stabilizers, organic pigments and dyes.

All processes which are suitable for the production of pigmented glass fiber reinforced thermoplastics are usable for the production of molding material according to the invention. The production may be carried out in any suitable kneading equipment, the thermoplastics being melted and mixed with the glass fibers, pigments, fillers and other additives. The proportion of glass fibers may be within the range from 10 to 60% by weight. The pigments used according to the invention may also be used in the form of a masterbatch. They may also be tumbled with the plastics prior to the production of the mixture or may be added later for example during injection molding.

The following Examples illustrate the invention.

EXAMPLE 1 a. 65 parts of polycaprolactam having a relative viscosity (measured as a 1% solution in concentrated sulfuric acid) of 2.91 is mixed with 1 part of a titanium dioxide having rutile structure (Mohs hardness from 6.5 to 7) in a fluid mixer and then melted in an extruder ZSK (Werner & Pfleiderer). Downstream of the melting zone 35 parts of glass fibers are introduced through an opening; the glass fibers have been provided with a size suitable for polyamides.

b. The experiment (a) is repeated but 2 parts of a zinc sulfide having wurtzite structure (Mohs hardness 3.5) is used instead of titanium dioxide.

The extrudate in each case is cooled and granulated. The granules are used to injection mold specimens which are used to measure the mechanical data given in Table 1. The moldings are tested dry in the freshly injection molded condition.

Table 1

| Experiment | (a) | (b) |
|---|---|---|
| tensile strength (DIN 53,455) in kg/cm$^2$ | 1,425 | 1,740 |
| impact strength (DIN 53,453) in cmkg/cm$^2$ | 34 | 49 |

EXAMPLE 2

A polybutylene terephthalate having a glass fiber content of 30% by weight is prepared by the methods described in Example 1. In case 2(a) 0.8% of titanium dioxide of rutile structure (Mohs hardness from 6.0 to 6.5) and in the case 2(b) 1.0% of a zinc sulfide pigment (Mohs hardness 3.5) is incorporated. Standard specimen bars which have been injected molded are measured in respect of their mechanical values given in Table 2.

Table 2

| Example | 2 (a) | 2 (b) |
|---|---|---|
| Addition | 0.8% TiO$_2$ | 1.0% ZnS |
| Tensile strength kg/cm$^2$ (DIN 53,455) | 1,047 | 1,250 |
| Impact strength cmkg/cm$^2$ (DIN 53,453) | 23.0 | 30.0 |

EXAMPLE 3

In the manner described in Example 2 mixtures of polybutylene terephthalate and glass fibers are prepared and in addition to the white pigment an organic dye having phthalocyanine structure is incorporated. Products colored for example blue or green are obtained. Practically identical mechanical data are measured on these mixtures as on the samples of Example 2.

What we claim is:
1. Thermoplastic molding material which comprises a mixture of
   a. a plastic selected from the group consisting of polyamide and polybutylene terephthalate; and
   b. from 10 to 60% by weight based on the weight of the molding material of glass fibers, said mixture further containing a pigmenting amount of
   c. zinc sulfide the amount of said zinc sulfide being from 1 to 2% by weight, based on the weight of the thermoplastic material.

* * * * *